United States Patent [19]

Hypolite

[11] 4,100,372

[45] Jul. 11, 1978

[54] AUDIO CONSOLE SYSTEM FOR HOME AND VEHICLE

[76] Inventor: Louis Hypolite, 9321 16th Ave., Apt. 2, St.Michel, Canada

[21] Appl. No.: 808,535

[22] Filed: Jun. 21, 1977

[30] Foreign Application Priority Data

Jun. 25, 1977 [GB] United Kingdom ............... 26491/77

[51] Int. Cl.² ........................... H04R 5/00; H04R 1/02
[52] U.S. Cl. ................................ 179/1 G; 179/1 VE; 181/148; 325/111
[58] Field of Search ................ 179/1 G, 1 GA, 1 VE, 179/1 E; 325/352, 353, 355, 356, 111, 117; 181/148, 150, 173

[56] References Cited

U.S. PATENT DOCUMENTS

| | | | |
|---|---|---|---|
| 2,165,637 | 7/1939 | Little | 179/1 VE |
| 2,866,891 | 12/1958 | Princ | 325/361 |
| 3,134,945 | 5/1964 | Wertheimer | 325/361 |
| 3,550,001 | 12/1970 | Hanley | 325/117 |
| 4,005,761 | 2/1977 | Okamoto et al. | 179/1 VE |

Primary Examiner—Douglas W. Olms

[57] ABSTRACT

An audio console system for use in a vehicle and a home and which comprises an audio console unit removably securable at the roof of a vehicle in replacement of the dome light and which is also usable in the home in combination with other components to form a home music system of the stereo type. This audio console unit is removably fixed by a pair of brackets at the roof of the vehicle cabin, forms a recess for a cassette player or other sound reproducing apparatus and has the necessary plugging devices to readily connect the audio console unit and the cassette player for energization of the latter by the wiring otherwise providing the D.C. power supply to the dome light now replaced by this audio console unit. The other system components include a home mounting base on which the audio console unit is operatively mounted in the home, and a pair of stereo speaker units connected to the home mounting base and each carrying a particular music playing apparatus to form an integrated stereo music system.

11 Claims, 6 Drawing Figures

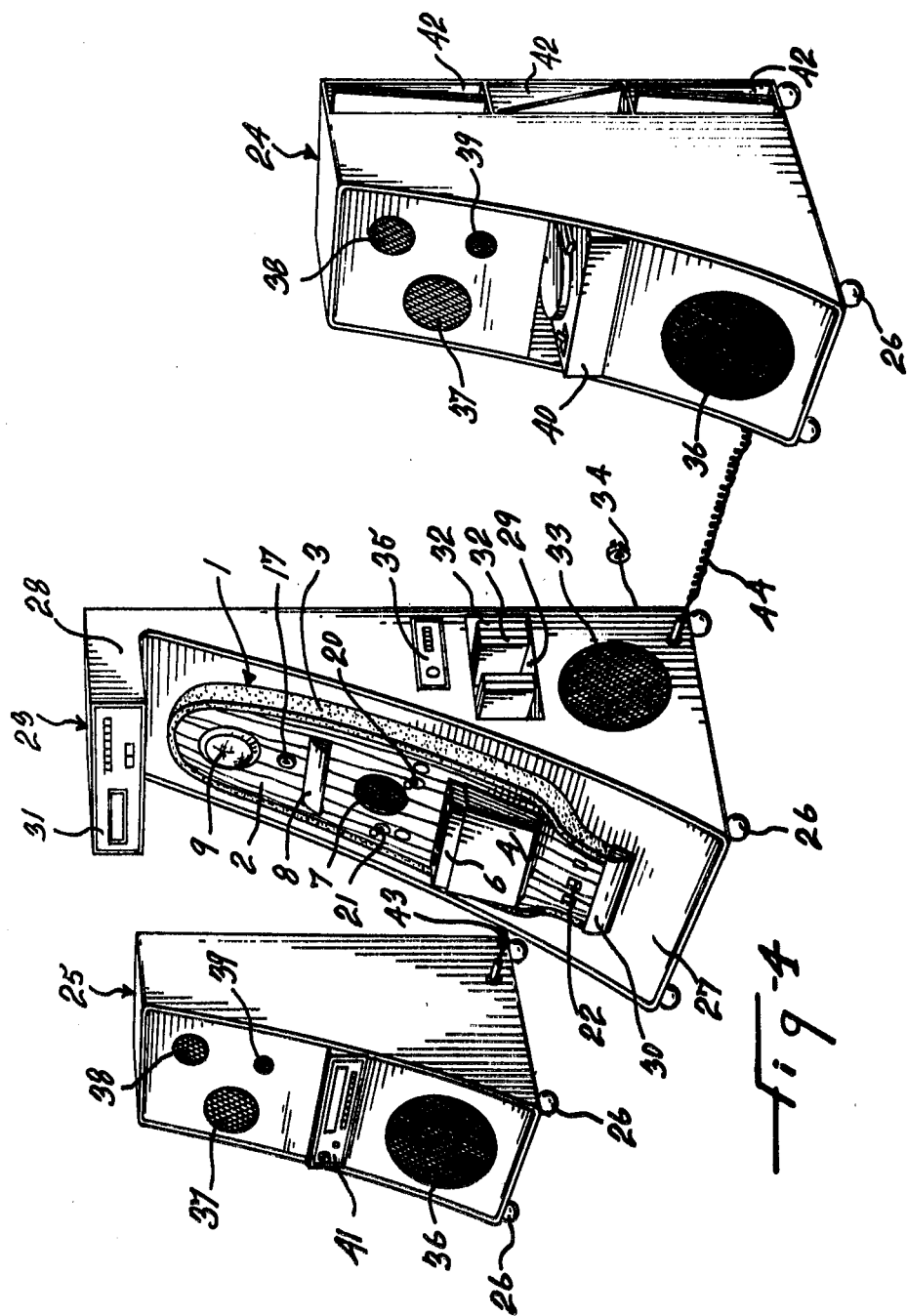

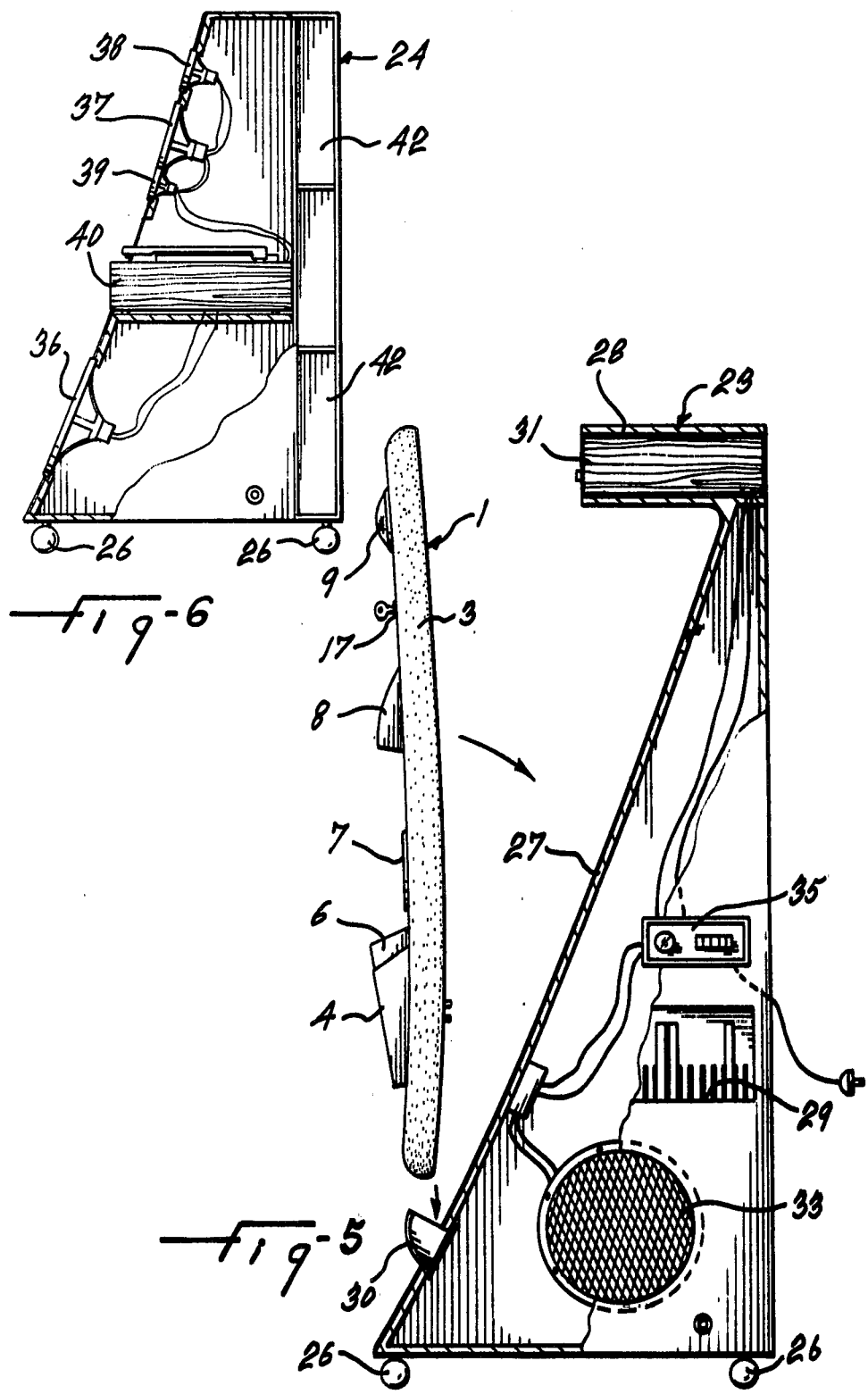

AUDIO CONSOLE SYSTEM FOR HOME AND VEHICLE

This invention relates to audio equipment for an automobile or vehicle, and more particularly, to an audio console system adapted to be removably mounted in the cabin of a vehicle such as in an automobile or truck.

There has been proposed in the prior art to removably mount audio equipment in a vehicle cabin such as in an automobile. Such audio equipment has so far been merely mounted under the dashboard of a vehicle by an appropriate mounting bracket. Such mounting of audio equipment results in placing the same close to the vehicle heater with ensuing inconveniences such as deterioration of the electric circuit components and softening of the cassette tapes under heat. Besides, such mounting results in a poor sound distribution inside the passenger compartment, producing a relatively lower audibility for persons on the back seat.

It is a general object of the present invention to provide audio equipment which is conveniently mountable in a vehicle cabin to avoid the above-mentioned disadvantages and yet which is easy to reach by the driver of the vehicle and gives more leg, room to the passengers and driver and is also hidden from the public eye.

It is another general object of the present invention to provide audio equipment in a vehicle cabin in the form of an audio console unit which may be readily installed in the vehicle and removed therefrom.

It is a more specific object of the present invention to provide an audio console which is conveniently mountable at the roof of a vehicle cabin and selectively removable to be taken away of the vehicle.

It is still another object of the present invention to provide an audio console unit which is mountable at the roof of a vehicle cabin and which conveniently connects to the existing roof wiring for energization of the unit.

It is a further object of the present invention to provide an audio console unit which is readily installable and replaces the dome light at the roof of a vehicle cabin and uses the D.C. supply wiring to the dome light for its energization.

The above and other objects and advantages of the present invention will be better understood with reference to the following detailed description of a preferred embodiment thereof which is illustrated, by way of example, in the accompanying drawings, in which:

FIG. 4 is a perspective view of an audio console system including the audio console unit of FIGS. 1, 2, and 3 arranged according to the present invention to form a stereo music system;

FIG. 5 is an elevation view partly broken away of a home mounting base forming part of the system of FIG. 4 and with the audio console unit in the process of being installed on the home mounting base; and FIG. 6 is a side elevation and partly broken away view of a speaker unit forming part of the system of FIG. 4.

Figure 1:
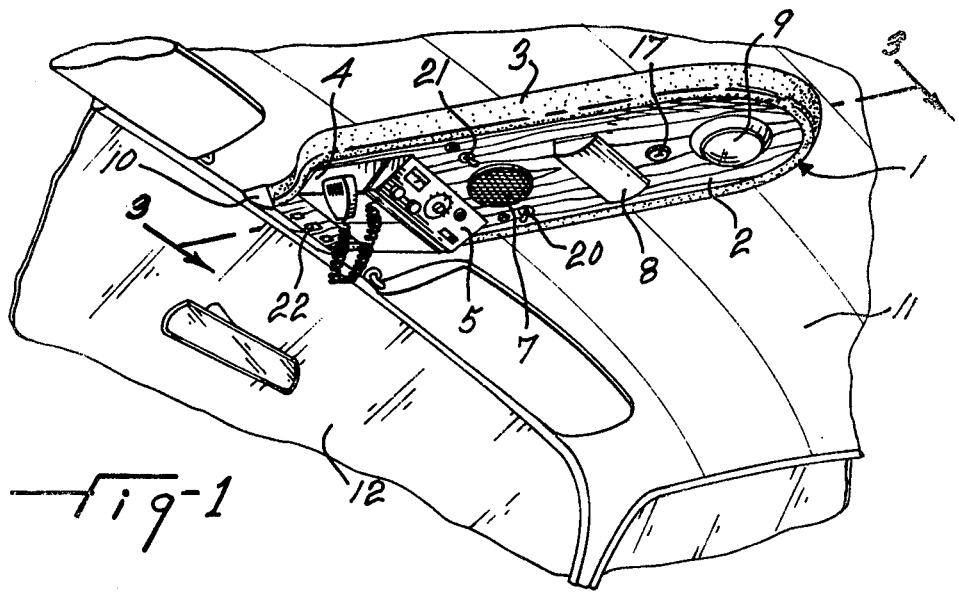
FIG. 1 is a perspective view of an audio console unit operatively secured at the roof of an automobile according to the present invention.

The illustrated audio console unit 1 is of shallow construction comprising a body formed of a wood baseboard 2 and a peripheral padding 3 of plastic foam or the like. The baseboard 2 has a nice decorative wood grain finish on the outside face thereof. The baseboard 2 may be made of any suitable material preferably with a decorative finish such as wood grains on the outside face thereof.

A metal bracket 4 is fixed to the baseboard 2 and outwardly projects from the latter to form a recess into which may be mounted a music playing apparatus or sound reproducing apparatus such as a CB transmitter unit 5. Instead of the CB transmitter unit 5, a cassette player 6, shown in FIG. 4, may be carried by the bracket 4. An electric plugging device, not shown, is preferably associated to the bracket 4 to automatically connect the transmitter 5 or cassette player 6 upon insertion in the recess defined by this bracket.

A loudspeaker 7 is fixed to the baseboard 2 and connected to the electric plugging device of the bracket 4 to transmit the sound output produced by the unit 5 or 6 as the case may be. A light unit 8 is fixed to the baseboard 2 and directed to illuminate the controls of the unit 5 or 6 and of the whole audio console unit 1. A light unit 9 is fixed to the baseboard 2 in replacement of the dome light of the vehicle.

Figure 3:
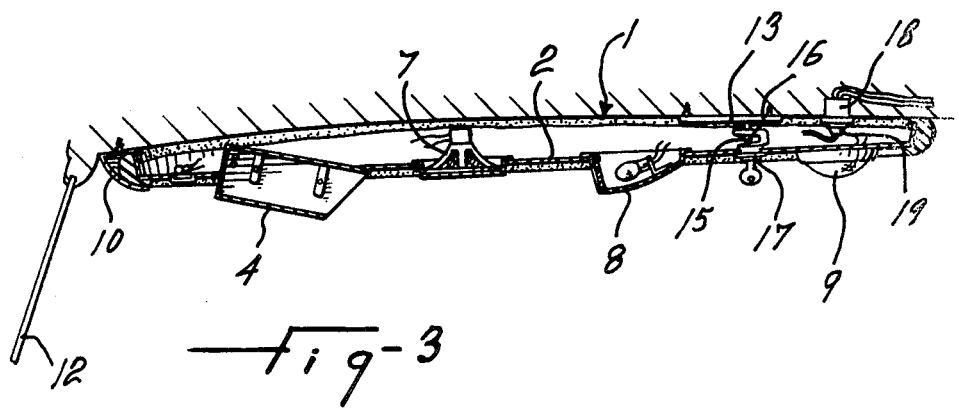
FIG. 3 is a cross-sectional view as seen along line 3—3 in FIG. 1.

The audio console system according to the present invention includes a front mounting bracket 10 which is fixed at the roof 11 of a vehicle cabin right next to the upper edge of the vehicle windshield 12. This front mounting bracket 10 forms a rearwardly open pocket adapted to snuggly fit one end of the audio console unit 1 therein, as shown in FIGS. 1 and 3. A rear mounting bracket 13 is fixed to the roof 11 and is adjustable in longitudinal alignment with the front mounting bracket 10 by means of slots 14 in the rear bracket. A transverse catch wire 15 is rigidly fixed to the rear mounting bracket 13 and is laterally spaced from the face of the latter to be lockingly engaged by a latch finger 16 of a key lock 17 forming part of the audio console unit 1.

A conventional electric plugging device 18 is fixed to the roof 11 of the vehicle in replacement of the usual dome light. Thus, this plugging device is connected to the wiring in the roof which otherwise provides the DC power supply to the dome light. An electric plug or plugging device 19 outwardly extends relative to the console body to operative engage the female plugging portion 18, when the console unit is locked in position. A first switch 20 is fixed to the baseboard 2 and connected to the plug 19 and the plugging device for the unit 5 or 6 to selectively switch the latter on and off. Another switch 21 is connected to selectively energize the light unit 9. A pilot light is provided at 22 and suitably connected to indicate when the unit 5 or 6 is in the power on condition.

The audio console system or home music system, as shown in FIG. 4, further includes a home mounting base 23, and a pair of stereo speaker units 24, and 25. Each of these components 23, 24 and 25 is mounted on casters 26 to be easily positioned as desired on the floor in a home.

Figure 2:
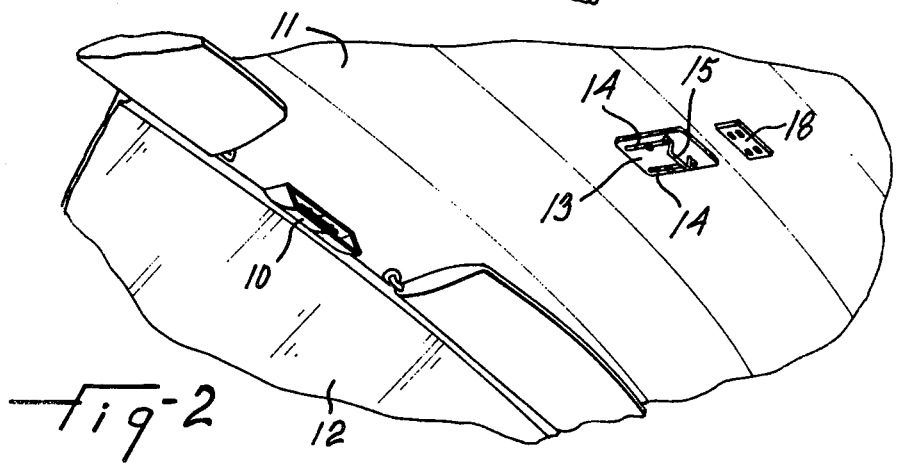
FIG. 2 is a perspective view of the roof of an automobile provided with the mounting brackets and the electric plugging device forming part of the illustrated embodiment of the present invention.

The home mounting base 23 includes a body of any suitable material such as wood, plastic, or fiberglass defining an inclined front face 27, a forwardly overhanging top portion 28, a storage shelf 29 in at least one side, and a trough like projection 30 on the front face 27 forming a pocket serving the same purpose as the pocket defined by the bracket 10 in FIGS. 1, 2 and 3. The equivalent to the rear mounting bracket 13 is not provided on the inclined front face 27 since the inclination of the latter and the projection 30 are sufficient to support the audio console unit 1 and in the home it is not imperative to lock this unit to the base.

A cassette recorder 31 is mounted in the overhanging top portion 28. The shelf 29 provides storage for cassettes 32. A loudspeaker 33 is provided on each side of the home mounting base 23. A DC plug 34 is connected to home mounting base 23 to provide ordinary AC power supply to cassette recorder 31 and to an AC to DC transformer circuit of any conventional type, represented by the unit 35. The latter is provided to convert AC to DC and thus feed the unit 6 with the same DC supply as in a vehicle.

The stereo speaker units 24 and 25 essentially constitute loundspeaker boxes provided each with any desired set of loudspeakers, such as the loudspeakers 36, 37, 38 and 39. Each stereo speacker unit 24 and 25 is provided with a front shelf on which is mounted a record player 40, for unit 24, and an AM-FM stereo receiver 41, for unit 25. The unit 24, preferably also the unit 25 is provided with disc record storage spaces 42.

Each music playing apparatus 31, 40 and 41 is connected to each of two stereo output channels connected to the stereo speaker units 24 and 25 respectively by the cables 43 and 44.

What I claim is:

1. An audio console system comprising at least one mounting bracket fixedly securable at the roof of a vehicle cabin and an audio console unit removably securable to said one mounting bracket and including a body forming a recess for a sound reproducing apparatus, a light secured to said body, a first electric plugging device outwardly extending relative to said body and connectable to the electric circuit of the vehicle, a second electric plugging device connected to said first electric plugging device and connectable to said reproducing apparatus, and switch means fixed to said body and operatively connecting said light and said second electric plugging device to said first electric plugging device and selectively energizing said light and a sound reproducing apparatus mounted into said recess.

2. An audio console system as defined in claim 1, wherein said audio console unit includes a key lock fixedly secured to said body and operatively locking the sound console unit to said mounting bracket.

3. An audio console system as defined in claim 2, wherein said audio console unit includes a loudspeaker operatively connected to said second electric plugging device and through the latter to the output of the sound reproducing apparatus.

4. An audio console system as defined in claim 3, wherein said audio console unit is elongated, another mounting bracket is fixedly securable at the roof of a vehicle and a mounting pocket in fore and aft alignment with said one mounting bracket, one end of said audio console unit removably engages into said mounting pocket.

5. An audio console system as defined in claim 4, wherein said audio console unit is shallow defining a pair of major opposite faces, one of said major faces rests against said roof over said one mounting bracket, and said recess, loudspeaker, light, and switch means are provided on the other of said opposite major faces and are downwardly accessible to a person in the vehicle cabin.

6. An audio console system as defined in claim 1, further comprising a home mounting base having one face against which said audio console unit is operatively fixed and a third electric plugging device forming an electric plug and socket connection in combination with said first electric plugging device.

7. An audio console system as defined in claim 6, wherein said home mounting base includes an AC plugging device operatively connectable to an ordinary AC house outlet, and an AC to DC voltage transformer circuit connecting said AC plugging device to said third electric plugging device for operation of said sound reproducing apparatus on the same DC power supply both in the vehicle and in the home.

8. An audio console system as defined in claim 7, further including a pair of stereo speaker units each having at least one loudspeaker electrically connected to a particular stereo channel output, and a particular music playing apparatus mounted on each of said stereo speaker units and said home mounting base and each connected to said home mounting base and each connected to said stereo channel outputs and to said AC plugging device for selective playing of each music playing apparatus.

9. An audio console system as defined in claim 8, wherein each of said stereo speacker units and said home mounting base constitutes an independent component of a stereo music system.

10. An audio console system as defined in claim 9, wherein said sound reproducing apparatus constitutes a cassette player.

11. An audio console system as defined in claim 9, wherein said sound reproducing apparatus constitutes a citizen band radio receiver.

* * * * *